Sept. 9, 1969     D. N. STEVENS ET AL     3,465,593
GRAVITY METERS FOR USE IN GEOPHYSICAL EXPLORATION
Filed July 25, 1966
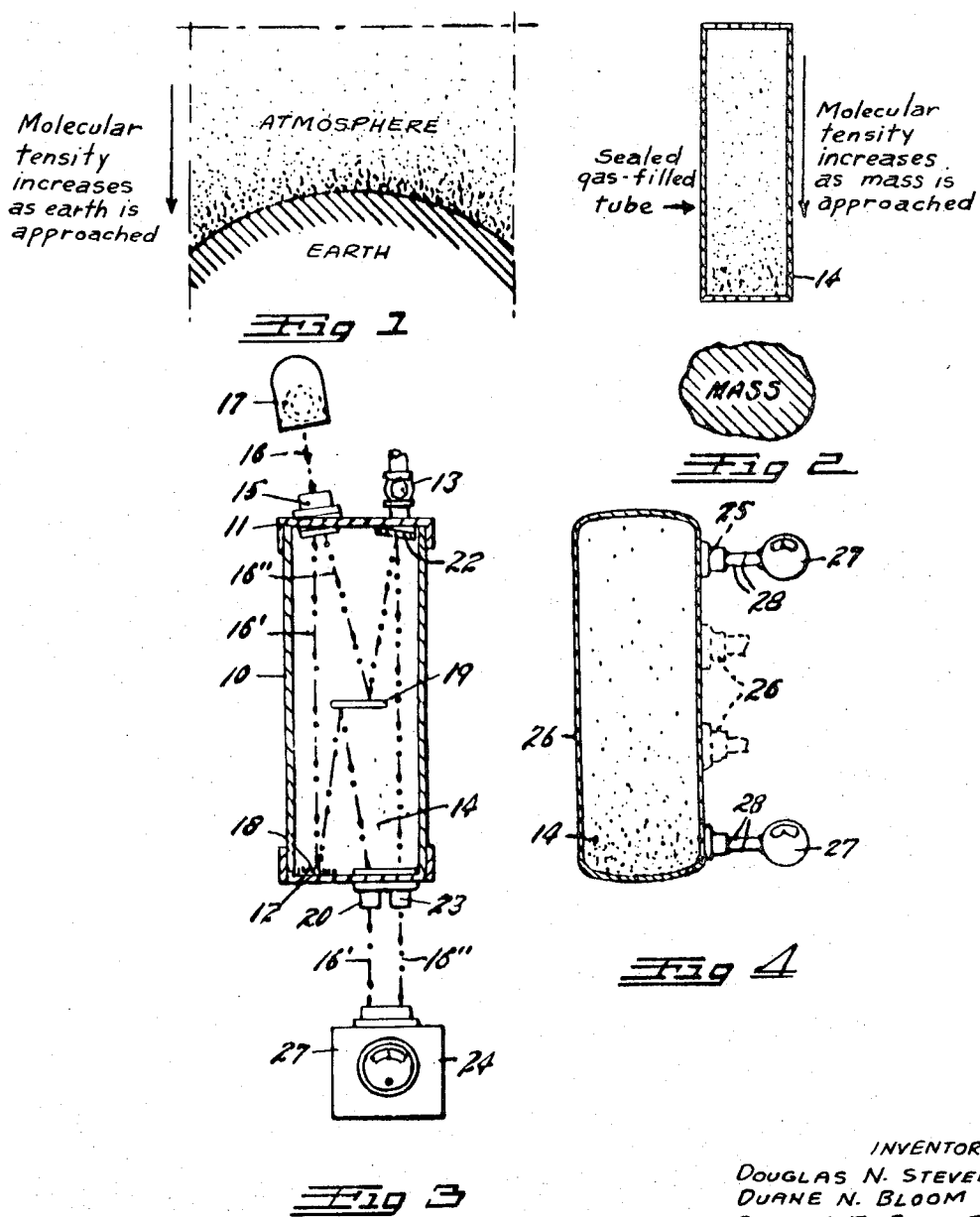
INVENTORS
DOUGLAS N. STEVENS
DUANE N. BLOOM
RAMON E. BISQUE
BY
ATTORNEY United States Patent Office 3,465,593
Patented Sept. 9, 1969

3,465,593
GRAVITY METERS FOR USE IN GEOPHYSICAL EXPLORATION
Douglas N. Stevens, Duane N. Bloom, and Ramon E. Bisque, Golden, Colo., assignors to Earth Sciences, Inc., Golden, Colo., a corporation of Colorado
Filed July 25, 1966, Ser. No. 567,439
Int. Cl. G01m 1/12
U.S. Cl. 73—382                          2 Claims

ABSTRACT OF THE DISCLOSURE

A gravity meter comprises an elongated non-convecting gas-filled container wherein variations in the gravitational field between two masses will be reflected as variations in the density of the molecular concentration of the gas in the container, two beams of light from a light source, and an interferometer which measures the gravity-induced concentration gradient of the molecules of the gas by detecting the phase shift between the two beams of light which are reflected by a system of mirrors through separate paths in the container.

---

This invention relates to a gravity meter more particularly for use in the geophysical exploration of subsurface structural anomalies from a moving vehicle, such as an airplane traveling over the surface being surveyed.

The principal object of the present invention is to provide a relatively simple, easily used, trouble-free and exceedingly sensitive gravity meter which may be readily transported over a selected area of the earth's surface to accurately detect and locate vertical and lateral variations and deviations in the subsurface structure of the area.

Attempts have been made to determine subsurface anomalies by detection of variations in the gravity gradient of a mass by means of gravimeters, torsion balances, swinging pendulums, falling bodies, etc. These devices have not proved commercially successful for aero-surveying due to mechanical difficulties and to time lag in operation.

Attempts have also been made to locate and chart deviations from the natural order of the subsurface of the earth by suspending fine, solid particles in a liquid, so that the concentration of the particles in the liquid will be influenced by gravity, and then determining changes in the gravitational effects on the particles by measuring the differences in the refractive index of the liquid containing the immersed particles by means of an interferometer. The results, however, have not been satisfactory due to the fact that the constant natural gravitational settlement of the solid particles in the liquid produces non-uniform variations in the index of refraction of the liquid which interfere with the accurate readings for which the device is intended. Attempts have been made to provide means for maintaining the particles in uniform suspension either electronically or mechanically but the result has only been to introduce additional complications and inaccuracies.

A further object of this invention is to provide a gravity meter for geophysical surveying which will eliminate the troubles resulting from particle suspensions in liquids and produce rapid, uniform and accurate gravity gradient readings.

Other objects and advantages will become apparent from the following description of the invention in which reference is made to the accompanying drawing which forms a part hereof.

The drawing consists of schematic representations of features to be referred to in the following specification. For instance:

FIG. 1 is a schematic diagram illustrating the increase in molecular density of the atmosphere as the earth is approached;

FIG. 2 is a similar diagram, to be later described, illustrating how this invention makes use of the phenomena of FIG. 1 for its operation;

FIG. 3 is a schematic diagram illustrating a setup for a first form of this invention; and FIG. 4 is a similar diagram illustrating the setup of a second, alternate form of the invention.

Fundamentally, the invention employs an elongated non-convecting gas-filled container provided with suitable conventional means for maintaining a constant temperature and positioned with one extremity directed toward a mass as diagramed in FIG. 2. The gas is completely gaseous. There are no liquids or suspended solids included therein. As a result, the gravitational effect of the mass acts upon the molecules of the gas, similarly to the action of the earth's gravitation field upon atmospheric molecules, such as shown diagrammatically in FIG. 1, to produce a concentration gradient in the gas which will define the gravitational field of the selected mass.

Since the gravitational attraction of a larger mass exceeds that of a smaller mass, a greater molecular density or molecular concentration will be produced in the gas by the larger mass. Therefore, the determination of the concentration gradient of the gas in the container will determine the gravitational field of the mass.

In view of the above, if the container be carried over the earth, variations in the gravitational field will be reflected as variations in density in the molecular concentration in the gas, as shown by the dotted areas in FIG. 2, and, since gravitational variations will be encountered as the container passes over subsurface anomalies, a gradient of the latter can be accurately produced by determining the concentration or density gradient of the sealed gas.

Determination of the density gradient may be made in many ways. One form of apparatus is diagrammatically illustrated in FIG. 3, in which a sealed, vertically elongated cylinder 10, similar to the container of FIG. 2, and provided with an upper end plate 11 and a lower end plate 12, is evacuated and pressure filled, through a valved intake 13, with a heavy gas 14, such as "radon," a uranium hexifluoride, under high pressure. The molecules of the gas will be affected by the gravitational forces present so that the concentration of gas molecules will increase as the bottom of the cylinder 10 is approached, similarly to the gas shown in FIG. 2.

A projection lens system 15 projects an incoming beam of light 16 from a common light source 17 downwardly through the top plate 11 into the cylinder 10. A portion of the beam 16, indicated at 16', strikes a lower mirror 18 on the lower end plate 12 and is reflected to a lower reflecting surface of a double-faced mirror 19. The mirror 19 in turn reflects the beam 16' downwardly through a directing lens system 20 into a conventional interferometer 21. A second portion of the incoming beam 16, indicated at 16'', is projected downwardly against an upper reflecting surface of the double-faced mirror 19 which reflects it upwardly to a top mirror 22, on the upper end plate 11. The mirror 22, in turn, reflects the beam 16'' downwardly through a second directing lens system 23 and into the interferometer 21 independently of the beam 16'.

The interferometer 21 is of the conventional type based on the principle that light waves that take different paths from a common source can fall out of phase and will cancel or reinforce each other when they reunite. The degree of "out of phase" is indicated upon a suitable interferometer index scale, such as indicated at 24, or other instrumentation.

In the present application, the above conditions of an interferometer are present. The common light source is indicated at 16. The light beams 16' and 16" take different paths, the beam 16' being reflected a plurality of times in the top half of the cylinder where the gas is less dense and the beam 18" being reflected back and forth a plurality of times in the lower half of the cylinder where the gas is extremely dense and concentrated. Since the less dense portion of gas has a lower index of refraction than the denser portion thereof and since the less dense portion will become increasingly less dense as the denser portion becomes increasingly more dense, the two light beams 16' and 16" will fall out-of-phase with each other, the degree of "out of phasement" being directly proportional to the molecular concentration gradient in the gas and to the gravitational field of the mass acting upon the gas. Therefore, structure of a sub-surface anomaly over which the gravity meter of this invention is passing can be instantly and accurately read upon the meter 24 or through other suitable instrumentation.

A second alternate means for detecting the molecular concentration is illustrated in FIG. 4 wherein a plurality of commercially available electronic pressure meters 25 are positioned in vertically spaced relation along a gas-filled cylinder 26. Two of the meters have been shown in full line. Additional meters may be added if desired as indicated in broken line. The meters 25 produce voltages proportionate to the density of the molecules and the resulting pressure of the gas at various elevations along the cylinder 26. Gravitationally-induced differences in the molecular concentration of the gas are read out on one or more millivoltmeters 27 electrically connected to the pressure meters 25, as indicated at 28, so that a pressure gradient and a corresponding gravitational gradient can be determined for use in detecting and measuring subsurface structural anomalies similarly to the first described form.

Thus, it can be seen that an extremely lightweight, economical, ultra-sensitive and accurate gravity meter has been produced, based upon the gravity-induced concentration gradient of the molecules of a gas, which will be exceedingly valuable for geophysical surveying use.

The invention has been more particularly described for geophysical use with the earth being assumed as the "mass." It would be equally valuable for determining the gravitational gradient of other "masses." Therefore, all directional words herein, such as "vertical," "top," "bottom," "upper," "lower," "downwardly," and "upwardly," refer to directions toward or away from any given "mass."

While preferred forms of the invention have been described in some detail together with the theories which it is believed to best explain its success, it is to be understood that the invention is not limited to the precise procedure described nor is dependent upon the accuracy of the theories which have been advanced. On the contrary, the invention is not to be regarded as limited except insofar as such limitations are included within the terms of the accompanying claims in which it is the intention to claim all novelty inherent in the invention as broadly as is permissible in view of the prior art.

Having thus described the invention what is claimed and desired to be secured by Letters Patent is:

1. A gravity meter for geophysical exploration of earth areas comprising:
   (a) a hollow sealed container;
   (b) a gas solely and completely filling said container, the molecules of said gas being urged downwardly by gravity so that the molecular concentration of said gas will increase as the bottom of said container is approached to produce a vertical pressure gradient in correspondence with the action of gravity;
   (c) a light source;
   (d) means for simultaneously projecting a first and a second light beam from said source through said gas, the path of the first beam being positioned principally at a lower elevation in said container than said second beam;
   (e) an interferometer positioned to receive said beams and detect phase shift between said two beams as a measurement of the vertical pressure gradient;
   (f) a downwardly reflecting top mirror positioned adjacent the top of said container;
   (g) an upwardly reflecting bottom mirror positioned adjacent the bottom of said container; and
   (h) mirror means positioned medially between said top and bottom mirrors, said first beam being reflected upwardly through the gas in the lower portion of said container from said bottom mirror to said mirror means thence downwardly through said lower portion to said interferometer and said second beam being reflected upwardly through the gas in the upper portion of said container from said mirror means to said upper mirror thence downwardly through both of said portions to said interferometer.

2. A gravity meter as described in claim 1 in which the mirror means comprises a double-faced mirror reflecting the first beam from its lower face and reflecting the second beam from its upper face.

References Cited

UNITED STATES PATENTS

| 3,084,557 | 4/1963 | Von Ahlefeldt | 73—516 |
| 3,228,246 | 1/1966 | Rosenthal | 73—388 |
| 3,309,930 | 3/1967 | Jones | 73—516 |

RICHARD C. QUEISSER, Primary Examiner

JOHN R. FLANAGAN, Assistant Examiner

UNITED STATES PATENT OFFICE
CERTIFICATE OF CORRECTION

Patent No. 3,465,593 September 9, 1969

Douglas N. Stevens, et al.

It is certified that error appears in the above identified patent and that said Letters Patent are hereby corrected as shown below:

Column 2, lines 43 and 44, "with a heavy gas 14, such as "radon," a uranium hexifluoride, under high pressure." should read -- with a heavy gas 14, such as "radon", or uranium hexifluoride, under high pressure. --.

Signed and sealed this 27th day of October 1970.

(SEAL)
Attest:

Edward M. Fletcher, Jr.  WILLIAM E. SCHUYLER, JR.
Attesting Officer  Commissioner of Patents